US008131216B2

(12) United States Patent
Bush

(10) Patent No.: US 8,131,216 B2
(45) Date of Patent: Mar. 6, 2012

(54) DATA FORMAT CONVERSION FOR ELECTRONIC DEVICES

(75) Inventor: Jeff Bush, San Jose, CA (US)

(73) Assignee: Apple Inc., Cupertino, CA (US)

( * ) Notice: Subject to any disclaimer, the term of this patent is extended or adjusted under 35 U.S.C. 154(b) by 660 days.

(21) Appl. No.: 12/346,330

(22) Filed: Dec. 30, 2008

(65) Prior Publication Data

US 2009/0170435 A1 Jul. 2, 2009

Related U.S. Application Data

(60) Provisional application No. 61/018,176, filed on Dec. 31, 2007.

(51) Int. Cl.
*H04B 7/00* (2006.01)

(52) U.S. Cl. ........................................ 455/41.2; 455/72

(58) Field of Classification Search ................. 455/41.2, 455/41.3, 70, 72, 507
See application file for complete search history.

(56) References Cited

U.S. PATENT DOCUMENTS

| | | | | |
|---|---|---|---|---|
| 7,899,396 | B2 * | 3/2011 | Meylan et al. | 455/41.2 |
| 7,929,912 | B2 * | 4/2011 | Sherman | 455/41.2 |
| 2008/0071528 | A1 | 3/2008 | Ubale et al. | |
| 2008/0164934 | A1 | 7/2008 | Hankey et al. | |

* cited by examiner

*Primary Examiner* — Jeffrey Zweizig
(74) *Attorney, Agent, or Firm* — Kramer Levin Naftalis & Frankel LLP

(57) ABSTRACT

Format converters and methods of performing data format conversion are provided. The format converters may convert compressed data into a different compressed format that is compatible with the Bluetooth transmission standard. The format converter may decompose the compressed data into frequency domain data streams of different frequency sub-bands. The format converter may transform each data stream of frequency domain information from a first encoding scheme to a second encoding scheme, and may then quantize the transformed data steams based on bit allocation information for each sub-band. The format converters may also include a bit allocation component which computes the bit allocation information for each sub-band based on an unfiltered version of the compressed data.

24 Claims, 6 Drawing Sheets

DATA FORMAT CONVERSION FOR ELECTRONIC DEVICES

CROSS-REFERENCE TO RELATED APPLICATION

This application claims the benefit of U.S. Provisional Patent Application No. 61/018,176, filed on Dec. 31, 2007, which is hereby incorporated by reference herein in its entirety.

FIELD OF THE INVENTION

This can relate to data format conversion in electronic devices and, more particularly, to the conversion of data into a format suitable for a particular transmission protocol.

BACKGROUND OF THE DISCLOSURE

Portable electronic devices such as digital electronic devices (e.g., music players and video players) are known. These devices are typically powered by one or more batteries. Batteries store a fixed amount of energy. Therefore, efficient use of the fixed energy source is desirable in order to maximize the length of time between battery replacements or recharges.

One operation that can consume the energy of a portable electronic device is format conversion of data. For example, the portable electronic device may be a media player that converts media files stored in a compressed format to a Bluetooth-compatible format. This type of format conversion allows the portable electronic device to wirelessly transmit media to a Bluetooth headset, for example, thereby enabling cordless use of the portable electronic device. While this wireless functionality is generally desirable, the format conversion performed by the portable electronic device may quickly drain the energy stored in its battery. Therefore, it would be desirable to provide an energy-efficient technique for converting data to a Bluetooth-compatible format.

SUMMARY OF THE DISCLOSURE

Systems and methods are provided for converting the format of data into a different format compatible with Bluetooth.

Electronic devices may communicate with one another using the Bluetooth protocol. For an electronic device to transmit data to another device, the transmitting electronic device may need to convert the transmitted data from its original format to a format compatible with the Bluetooth transmission protocol. The transmitted data may originally be in a first encoding format, such as in a compressed format suitable for storage purposes. For example, the transmitted data may be audio media, and may originally be in an MPEG-1 Audio Layer-3 ("MP3") or an MPEG-4 format, or in another format obtained from advanced audio coding ("AAC"). The first encoding format can represent data in the frequency domain, and may not be suitable for the Bluetooth protocol.

To convert the format of the compressed data to one that is compatible with Bluetooth, the electronic device can include a format converter for performing data format conversion on frequency domain information (e.g., audio media in a first encoding format) to produce data in a second, Bluetooth-compatible encoding format. Various embodiments are provided for performing this data conversion in an energy-efficient manner, thereby conserving battery power in a portable electronic device.

In some embodiments of the invention, the format converter can include a band separation module, a bit allocation unit, a plurality of conversion modules, and a plurality of quantizers. The band separation module can decompose the frequency domain information (e.g., AAC-encoded data), which is contained within a frequency band, into a plurality of data streams. For example, the band separation module can act as a demultiplexer to separate the frequency domain information into parts based on frequency ranges. Each data stream can be in the frequency domain and can be associated with a distinct sub-band of the frequency band. The band separation module can decompose an unfiltered version of the frequency domain information. An "unfiltered version" of information may hereinafter refer to information in the first encoding format, where the information has not yet started a transformation into the second encoding format.

In some embodiments, the bit allocation unit may be configured to compute bit allocation information for each of the distinct sub-bands using the unfiltered version of the frequency domain information. The bit allocation information for each sub-band may be indicative of the amount of the frequency domain information contained in that sub-band.

The format converter can include a plurality of conversion modules. In some embodiments, each of the conversion modules can be configured to transform one of the data streams produced by the band separation module from the first encoding format to the second encoding format. For example, each conversion module may transform one of the data streams from a first frequency domain representation (e.g., AAC) of a time domain signal into a second frequency domain representation of the time domain signal. The second frequency domain representation may be compatible with the Bluetooth transmission protocol, and the conversion modules may transform the data streams from the first to the second frequency domain representation without first converting the data streams into the time domain.

The plurality of quantizers can each be configured to quantize one of the transformed data streams. In some embodiments, each of the quantizers can perform the quantization on a transformed data stream based on the bit allocation information for the sub-band associated with that transformed data stream. For example, a quantizer may use more data (e.g., more quantization levels) to represent a transformed data stream when the bit allocation information for the associated sub-band indicates that the transformed data stream corresponds to a larger amount of the frequency domain information. A quantizer may use less data (e.g., fewer quantization levels) to represent a transformed data stream when the associated bit allocation information indicates that the transformed data stream corresponds to a smaller amount of the frequency domain information.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
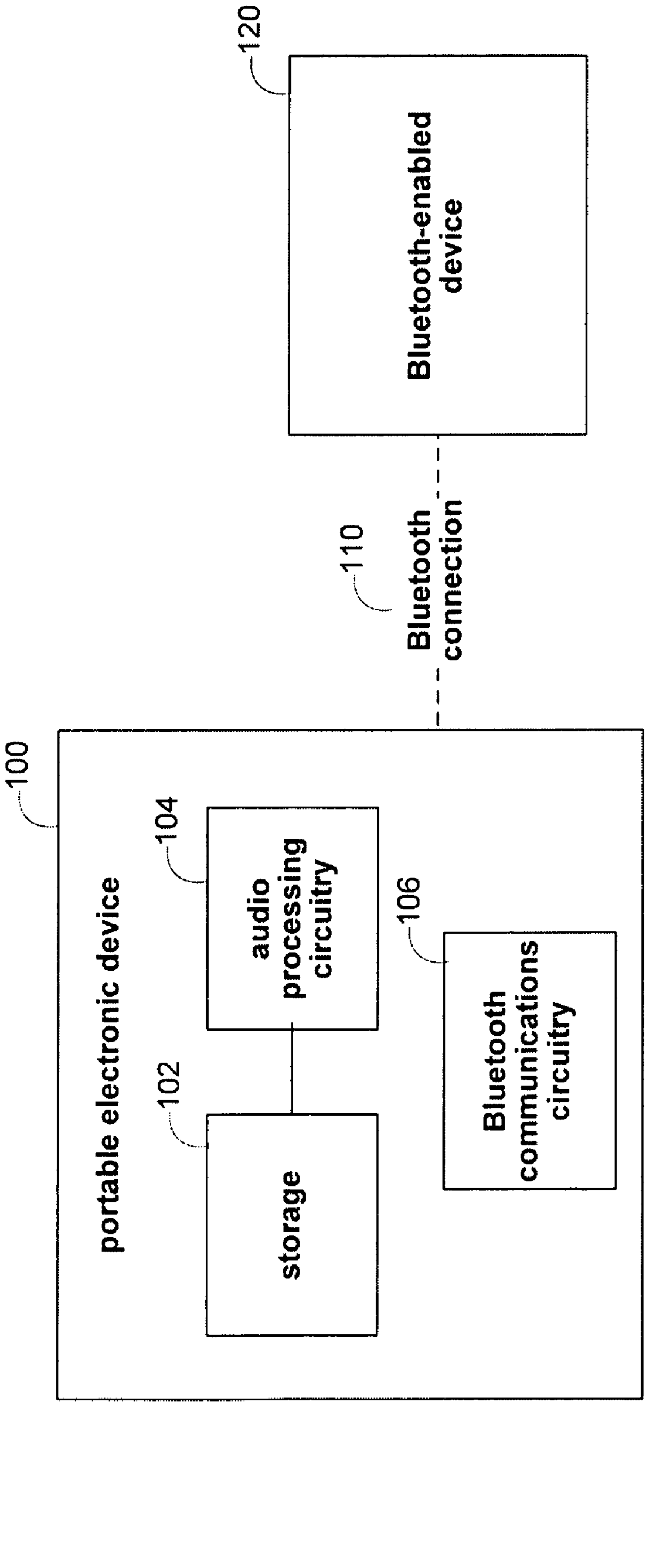
FIG. 1 shows a simplified system diagram with Bluetooth-enabled electronic devices in accordance with an embodiment of the invention.

Data can be transferred from one electronic device to another using an established transmission protocol. For example, two devices that have Bluetooth capability can communicate with one another wirelessly using a Bluetooth interface. FIG. 1 illustrates a system that can include two such electronic devices: portable electronic device 100 and Bluetooth-enabled device 120.

In some embodiments, portable electronic device 100 can be configured to transmit data to Bluetooth-enabled device 120 via Bluetooth connection 110. For example, portable electronic device 100 can be a portable media player (e.g., Apple's iPod or iPhone) that can provide music, videos, pictures, or any other type of media to Bluetooth-enabled device 120. Bluetooth-enabled device 120 can be a corresponding audio, visual, or audio/visual output device that can play the media received from portable electronic device 100. In one such embodiment, Bluetooth-enabled device 120 can be a wireless headset that has any of the features or functionalities of the wireless headsets discussed in commonly assigned U.S. patent application Publication No. 2008-0164934, published Jul. 10, 2008, which is hereby incorporated herein by reference in its entirety. In this embodiment, a user of portable electronic device 100 and Bluetooth-enabled device 120 can view or listen to media without the inconvenience of having a physical cable connecting these devices.

Portable electronic device 100 can include storage module 102, audio processing circuitry 104, and Bluetooth communications circuitry 106. These components enable portable electronic device 100 to provide media in a format that can be transmitted to Bluetooth-enabled device 120 via Bluetooth connection 110. The media that is transmitted to Bluetooth-enabled device 120 can be stored in and provided from storage module 102. Storage module 102 can be based on any suitable type of storage medium, such as random access memory ("RAM"), read-only memory ("ROM"), hard disk, or FLASH-based storage system. In some embodiments, storage module 102 can be a removable storage element, such as a digital versatile disk ("DVD") or CD-ROM, that is coupled to and read from by portable electronic device 100.

The media files stored in storage module 102 can be in a format that is preferable for storage, but not particularly suitable for Bluetooth transmission. For example, media can be stored in a compressed format that efficiently utilizes storage space of storage module 102, but is not compatible with the Bluetooth transmission standard. For audio files, the compressed media can be encoded using an MP3, MPEG-4, or AAC compression algorithm, none of which is compatible with Bluetooth. Audio processing circuitry 104 can therefore include any suitable circuitry or logic for processing the media files stored in storage module 102 such that the resulting audio data is in a format compatible with Bluetooth transmission.

Bluetooth communications circuitry 106 can prepare data, such as decompressed audio from audio processing circuitry 104 (or other data stored in storage module 102), into signals capable of being transmitted using Bluetooth connection 110. Bluetooth communications circuitry 106 can operate on media and other types of data that are compatible with the Bluetooth standard. To prepare this compatible data for transmission, Bluetooth communications circuitry 106 may, for example, assemble the data into frame sizes that are specified by the Bluetooth standard. Bluetooth communications circuitry 106 may also include any suitable modulators/demodulators that can convert the data into signals using a modulation scheme specified by the standard. Thus, the Bluetooth capabilities of portable electronic device 100 may be embodied by Bluetooth communications circuitry 106.

Although FIG. 1, as well as the remaining figures in this disclosure, are described in terms of transmitting media data, and in particular audio data, from a portable electronic device (e.g., portable electronic device 100), it should be understood that this is merely illustrative and intended to simplify the description of the invention. Portable electronic device 100 may be configured to store and transmit other types of data, such as but not limited to, information about media (e.g., artist name, song title), preference settings, device settings, or user information. Also, while FIG. 1 and the remaining figures in this disclosure are described in terms of converting data into a Bluetooth-compatible format, it should be understood that the advantages and aspects of the present invention may be used with other transmission protocols. Therefore, the embodiments are described in terms of Bluetooth for clarity and simplification, and not for limitation.

Figure 2:
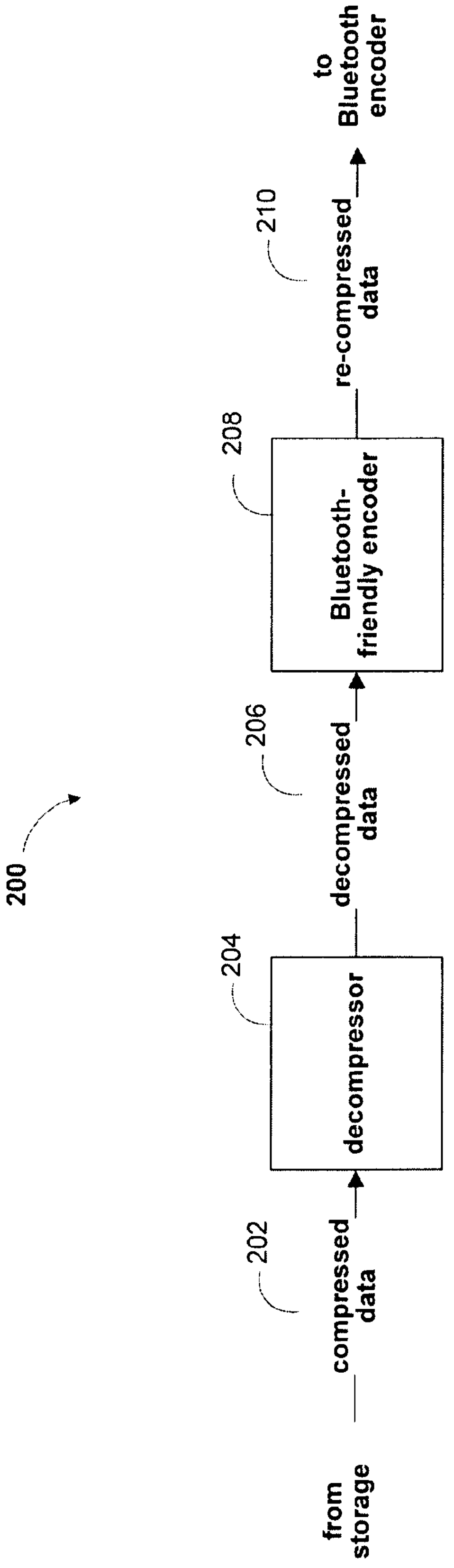
FIG. 2 shows a simplified block diagram of an audio format converter in accordance with an embodiment of the invention.

FIG. 2 shows a simplified block diagram of audio format converter 200 that may convert audio from its current format to a format compatible with the Bluetooth protocol. Audio format converter 200 illustrates one embodiment of audio processing circuitry 104 shown in FIG. 1. Audio format converter 200 may include decompressor 204 and Bluetooth-friendly encoder 208 for performing format conversion on compressed data 202. Compressed data 202 may be audio media derived from a storage module (e.g., storage module 102), and may be encoded using a compression algorithm not suitable for Bluetooth transmission (e.g., MPEG, MP3, or AAC).

Decompressor 204 can be used to decode compressed data 202. As a result, decompressor 204 can recover a lossy version of the original, uncompressed data. This lossy version is referred to in FIG. 2 as decompressed data 206. For example, if compressed data 202 is audio media represented in an MP3 or MPEG-4 format, decompressor 204 can be an MP3 or MPEG-4 decoder that converts the audio file into a lossy, digitized audio signal. Thus, decompressed data 206 produced by decompressor 204 can be a different representation of the same audio media.

Decompressed data 206 can be in a format that uses a significantly greater number of bits or data units in the representation of the audio media than that used by compressed data 202. As the Bluetooth transmission scheme has a limited transmission throughput, directly transmitting decompressed data 206 may be undesirable. In particular, directly transmitting decompressed data 206 may be slower than a user can tolerate and may overly drain the battery of a portable electronic device. Therefore, Bluetooth-friendly encoder 208 can encode decompressed data 206 to produce re-compressed data 210. Re-compressed data 210 is yet another representation of the same audio media. Like compressed data 202, re-compressed data 210 may be a significantly smaller-sized representation of the audio media. However, the compression algorithm used by Bluetooth-friendly encoder 208 can be different from the algorithm originally used to obtain compressed data 202, and can instead be a compression technique compatible with Bluetooth. Thus, re-compressed data 210 can be suitable for processing by the device's Bluetooth communications circuitry (e.g., Bluetooth communications circuitry 106). For example, rather than encoding the audio using the MP3 or MPEG-4 compression algorithm, Bluetooth-friendly encoder 208 can encode the audio media data using an encoding technique referred to as "sub-band coding." Sub-band coding refers to any encoding technique that decomposes the data it intends to encode into multiple frequency sub-bands, and then separately encodes the data in each frequency sub-band. Due to the characteristics of audio and visual media, as well as user perception of audio and visual media, sub-band coding can be especially effective for encoding audio and video signals.

Figure 3:
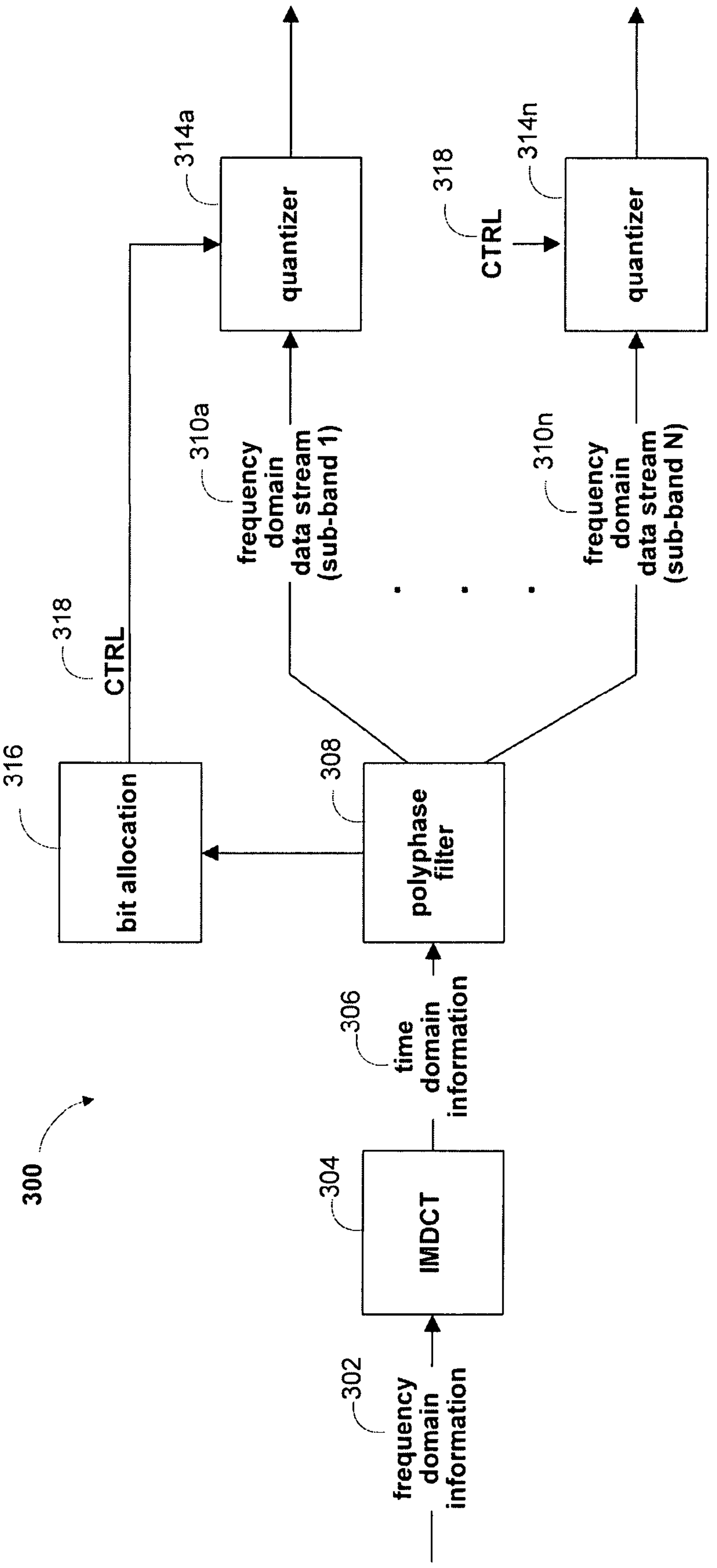
FIGS. 3 and 4 show more detailed, yet still simplified, block diagrams of audio format converters in accordance with various embodiments of the invention.

FIG. 3 shows a more detailed, yet still simplified, block diagram of an audio format converter 300, which can be configured to decode and re-encode data using sub-band encoding. Audio format converter 300 can be representative of a more detailed view of audio format converter 200 of FIG. 2, and therefore can illustrate an embodiment of audio processing circuitry 104 of FIG. 1, or it can be a completely separate design. Audio format converter 300 can include IMDCT component 304, polyphase filter 308, quantizers 314*a*-314*n*, and bit allocation component 316.

Format converter 300 can operate on frequency domain information 302 (e.g., on an unfiltered version of frequency domain information 302). Frequency domain information 302 can represent any suitable type of media (e.g., audio, visual, audio/visual), and can be obtained from any of a variety of sources, such as a storage module (e.g., storage module 102 of FIG. 1). Frequency domain information 302 can have any of the features of compressed data 202 of FIG. 2, and can be in a format that represents data in the frequency domain. That is, frequency domain information 302 can include a plurality of data units, where the value of each data unit indicates the amount of information at a given frequency. Frequency domain information 302 can be compressed audio data. For example, frequency domain information 302 can be a media file that has been encoded using advanced audio coding ("AAC"). The AAC standard provides a compression technique that converts audio data, represented in the time domain, to the frequency domain using a transform referred to as the modified discrete cosine transform ("MDCT"). However, it should be understood that the audio signals can be encoded based on any suitable type of transform-based compression algorithm (e.g., DCT).

IMDCT component 304 can have any of the features or functionalities of a decompressor such as decompressor 204 in FIG. 2. In particular, IMDCT component 304 can decompress frequency domain information 302 such that it can be re-encoded into a Bluetooth-friendly format. IMDCT component 304 can include any suitable circuitry or logic for performing an inverse modified discrete cosine transform ("IMDCT"). The IMDCT performed by IMDCT component 304 is the inverse process of the MDCT, and can therefore decompress AAC-encoded frequency information or any other frequency information originally encoded using an MDCT-based compression algorithm. However, it should be understood that IMDCT component 304 can be replaced with a component based on a different inverse transform (e.g., IDCT) if frequency domain information 302 is encoded using a different compression technique.

IMDCT component 304 can provide time domain information 306 that is a time domain representation of frequency domain information 302. The frequency structure of audio often allows audio media to be more concisely represented in the frequency domain. Therefore, time domain information 306 can be a substantially larger representation of the same audio media. To re-compress this information, time domain information 306 can be processed by polyphase filter 308 and quantizers 314*a*-314*n*. Polyphase filter 308 and quantizers 314*a*-314*n* may operate collectively to implement sub-band coding.

Polyphase filter 308 can first decompose time domain information 306 into a plurality of separate data streams in the frequency domain. Polyphase filter 308 can convert time domain information 306 into the frequency domain, and can decompose the resulting frequency domain representation into separate data streams. Polyphase filter 308 can convert and decompose time domain information 306 into any suitable number of data streams in the frequency domain. For example, referring to FIG. 3, polyphase filter 308 can convert and separate time domain information 306 into N different data streams, e.g., into frequency domain data stream 310*a* through frequency domain data stream 310*n*, where N can be any suitable number of at least two.

Each data stream produced by polyphase filter 308 may be associated with a particular frequency sub-band. For example, Data stream 310*a* can include frequency data contained in the first sub-band (sub-band 1) and data stream 310*n* can include frequency data contained in the Nth sub-band (sub-band N). For audio media, the first frequency sub-band can be within a band of frequency that, for example, encompasses the lowest tones that can be deciphered by the human ear. The Nth frequency sub-band can encompass the highest tones decipherable by the human ear.

Quantizers 314*a*-314*n* can quantize the data streams into quantization levels. The quantization levels can refer to the different digital values used by a quantizer to represent its corresponding portion of the audio media. Each quantizer may use the same or a different number of quantization levels as another quantizer. A larger number of quantization levels in a given frequency range allows for consecutive quantization levels to be closer in value, and therefore allows for a finer resolution in the resulting encoded stream. This can be advantageous for frequency sub-bands that carry a large proportion of frequency domain information 302. A larger number of quantization levels also, however, increases the amount of encoded information that may be needed to represent each data stream.

Quantizers 314*a*-314*n* can quantize the frequency domain data streams using quantization levels based on control information 318. Control information 318, which may sometimes be referred to as "bit allocation information," can be computed by bit allocation component 316. Bit allocation component 316 can identify which data streams provided by polyphase filter 308 contain more frequency information relative to other data streams, and therefore which data streams warrant being encoded with a finer resolution. Thus, based on control information 318, quantizers 314*a*-314*n* can provide quantized data streams of varying resolutions, and therefore varying data sizes, that are then arranged into frames for transmission using a Bluetooth connection (e.g., by Bluetooth communications circuitry 106 of FIG. 1). This enables the Bluetooth transmission to be as small as possible while maintaining the proper quality in the overall signal (e.g., by only increasing resolution and data size where it is needed).

Audio format converters 200 and 300 of FIGS. 2 and 3 illustrate merely one technique for preparing compressed data for transmission using Bluetooth. In particular, format converters 200 and 300 illustrate a technique that fully decodes compressed data, and then completely re-encodes the decompressed data into a Bluetooth-friendly format. For a portable electronic device, such as a portable media player (e.g., Apple's iPod or iPhone), these decoding and encoding steps can be computationally expensive, and can therefore more quickly consume the energy stored in the device's battery. In particular, in some embodiments, the speed requirements of an electronic device may necessitate a more energy-consuming implementation of audio format converters 200 and 300 than would otherwise be necessary. For example, if a stored music file is being rendered by audio format converters 200 and 300 and played by a Bluetooth-enabled wireless headset, audio format converters 200 and 300 may need to decode and re-encode the media file such that the music can be played by the wireless headset in real-time and without interruption. Implementations of audio format converters 200 and 300 that can perform real-time decoding and re-encoding of data may be energy-consuming.

Polyphase filter 308 can be a particularly energy-consuming component of the components in audio format converter 300 of FIG. 3. Polyphase filter 308 operates on data in the time domain and provides a plurality of separate data streams in the frequency domain. The real-time time-to-frequency conversion performed by polyphase filter 308 may be highly resource-intensive.

Figure 4:
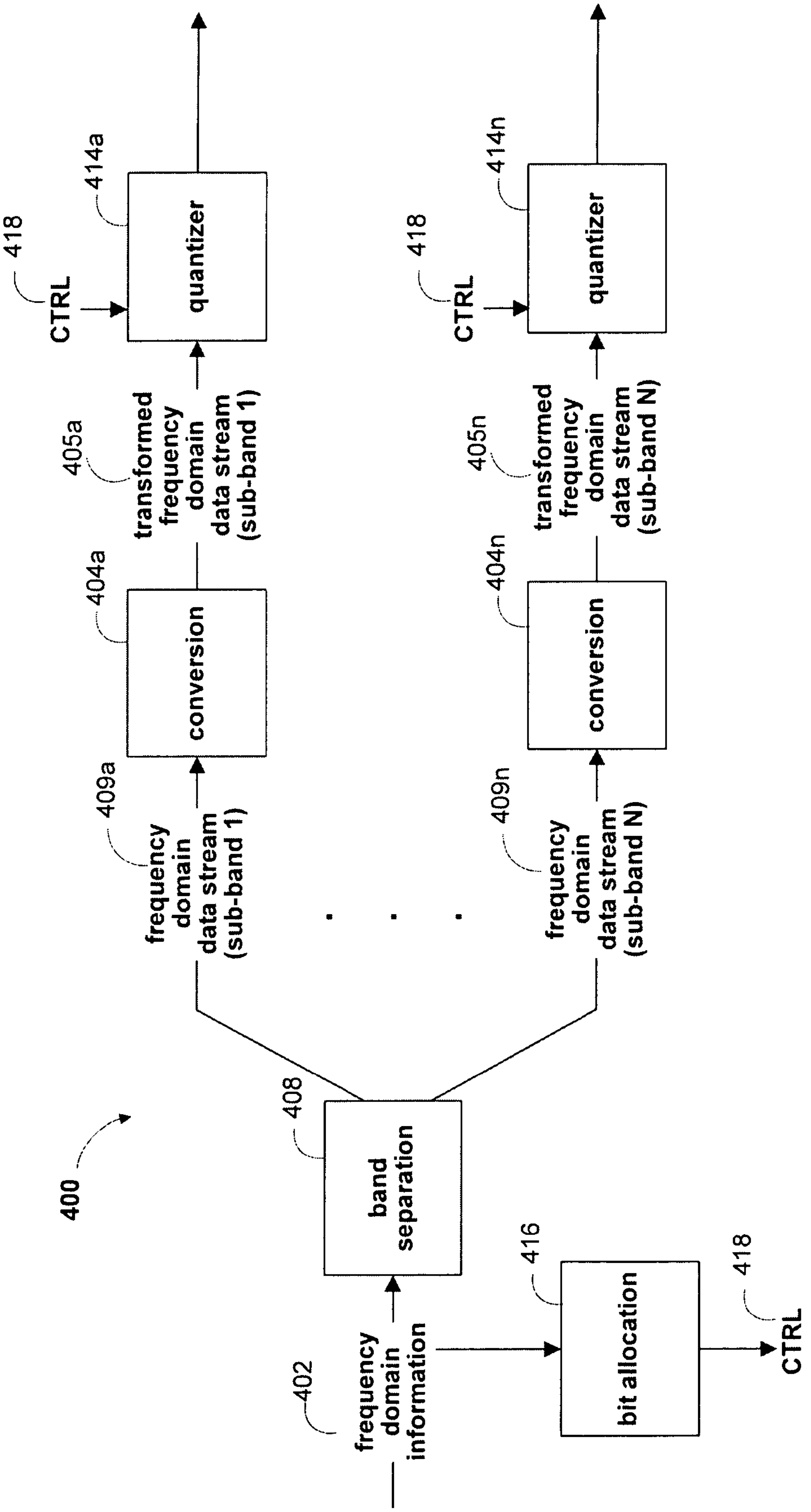

FIG. 4 shows a simplified block diagram of audio format converter 400 that can address at least some of the complexity issues previously discussed, and therefore increase the efficiency of battery use in portable electronic devices. Audio format converter 400 can include band separation module 408, conversion modules 404*a*-404*n*, quantizers 414*a*-414*n*, and bit allocation component 416.

As described above, frequency domain information 402 can be data of any suitable type and can be compressed using any suitable MDCT-based compression scheme (e.g., AAC-encoding) or other frequency-based compression scheme. Band separation module 408 can decompose frequency domain information 402 into a plurality of data streams. For example, as shown in FIG. 4, band separation module 408 can separate frequency domain information 402 into N separate frequency domain data streams 409*a*-409*n*, where N is at least two.

Each of frequency domain data streams 409*a*-409*n* may be associated with a distinct sub-band. For example, data stream 409*a* can include the part of frequency domain information 402 contained in sub-band 1, and data stream 409*n* can include the part of frequency domain information 402 contained in sub-band N. Band separation module 408 may therefore have a similar task as polyphase filter 308 (FIG. 3) of producing a plurality of data streams in the frequency domain. Unlike polyphase filter 308, both the input data and the output data of band separation module 408 are represented in the same domain—e.g., the frequency domain. Band separation module 408 can therefore produce a plurality of data streams by dividing frequency domain information 402 into N parts. Thus, in some embodiments, band separation module 408 is essentially a 1:N demultiplexer, and may be implemented using any known demultiplexer implementations.

Demultiplexers can be implemented using logic or circuitry that is not computationally expensive. A demultiplexer implementation of band separation module 408 can therefore be substantially more energy-efficient than polyphase filter 308 of FIG. 3. This is due at least in part to the ability of band separation module 408 to operate solely in one domain, the frequency domain. Although band separation module 408 and polyphase filter 308 may have the same or similar function of separating data based on different frequency sub-bands, these components can perform substantially different operations that consume substantially different amounts of power.

Frequency domain data streams 409*a*-409*n* can each be provided to one of conversion modules 404*a*-404*n*. Conversion modules 404*a*-404*n* can each operate on one of the data streams provided by band separation module 408. For example, conversion module 404*a* may process data stream 409*a* associated with the lowest sub-band (e.g., sub-band 1) and conversion module 404*n* may process the data stream 409*n* associated with the highest sub-band (e.g., sub-band N). Conversion modules 404*a*-404*n* may perform any suitable operations to transform frequency domain data streams 409*a*-409*n* (having a first encoding format) into transformed frequency domain data streams 405*a*-405*n* (having a second encoding format). For example, if the first encoding format is an AAC encoding format, conversion modules 404*a*-404*n* may translate the MDCT-based frequency representation of frequency domain information 409*a*-409*n* into data based on a different frequency transform.

In some embodiments, conversion modules 404*a*-404*n* may convert frequency domain data streams 409*a*-409*n* to an encoding format based on a frequency transform that is compatible with the Bluetooth protocol. In these embodiments, frequency domain data streams 409*a*-409*n* may be referred to as Bluetooth sub-band frequency information. This way, the converted data produced by conversion modules 404*a*-404*n* can be in a format that allows the converted data to be assembled into frames and transmitted using Bluetooth. The converted data can (after being quantized by quantizers 414*a*-414*n*) be directed to Bluetooth communications circuitry (e.g., Bluetooth communications circuitry 106 of FIG. 1), which can transmit the compressed data to another Bluetooth-enabled device (e.g., Bluetooth-enabled device 120 of FIG. 1), for example.

Using conversion modules 404*a*-404*n*, audio format converter 400 essentially takes advantage of the known properties of two known encoding formats—that is, the first encoding format of frequency domain information 402 and the second encoding format of the Bluetooth-friendly data. Using these known properties, conversion modules 404*a*-404*n* may generate Bluetooth-friendly frequency information without first having to decompress frequency domain information 402 (or the corresponding data streams) into its time domain representation. Conversion modules 404*a*-404*n* can in essence partially decode compressed data and then partially re-encode the decoded data. When compared to audio format converter 300 of FIG. 3, which fully decodes compressed data into the time domain and fully re-encodes that data, the number and complexity of the computations executed by format converter 400 may be significantly lower.

Quantizers 414*a*-414*n* can quantize the transformed data streams 405*a*-405*n* produced by conversion modules 404*a*-404*n*. Quantizers 414*a*-414*n* may have any of the features and functionalities and/or additional features and functionalities of quantizers 314*a*-314*n* (FIG. 3). For example, each quantizer may quantize a transformed data stream, which is associated with a distinct sub-band, into digital values based on quantization levels. In some embodiments, quantizers 414*a*-414*n* can determine the number and resolution of the quantization levels for each transformed data stream based on control information 418 computed by bit allocation component 416, for example.

Bit allocation component 416 can have any of the features and functionalities of bit allocation component 316 of FIG. 3 and/or additional features and functionalities. For example, bit allocation component 416 can identify the amount and/or magnitude of frequency domain information 402 included in each frequency sub-band, and therefore the amount of quantization that should be used for each sub-band. Unlike in FIG.

3, bit allocation component 416 can compute control information 418 based on the frequency profile of an unfiltered version of frequency domain information 402. In other words, bit allocation component 416 can compute control information 418 based on audio media data in its original, first encoding format. Because frequency domain information 402 is in the frequency domain, bit allocation component 416 can directly analyze the frequency profile of the unfiltered version of frequency domain information 402. This may allow bit allocation component 416 to be implemented in a way that manages energy consumption in an even more efficient manner.

Moreover, it can be beneficial for bit allocation component 416 to operate using an unfiltered version of frequency domain information 402 because of the potentially high-quality compression techniques used to obtain frequency domain information 402. Frequency domain information 402 can be obtained using more complex and effective compression algorithms that may not be able to operate in real time. The compression algorithms may not need to operate in real time when, for example, the compression algorithms used to obtain frequency domain information 402 are intended to compress media files for storage (e.g., in storage module 102) and not to enable real-time rendering. Due to the high-quality encoding technique employed, frequency domain information 402 may have been compressed such that any adverse data loss effects on the overall audio media can be minimal. Accordingly, an unfiltered version of frequency domain information 402 can be used as an effective blueprint for determining the appropriate bit allocation for different frequency bands.

Bit allocation component 316 of FIG. 3, in comparison, operates on data that is in the midst of being re-encoded in real-time. Accordingly, the information used by bit allocation component 316 may not as effectively indicate the appropriate number of quantization levels to use for each sub-band. Therefore, it can be advantageous for bit allocation component 416 to use frequency domain information 402 to determine the bit allocation of quantizers 414*a*-414*n*.

In some operating scenarios, from examining an unfiltered version of frequency domain information 402, bit allocation component 416 can determine that one or more of frequency domain data streams 409*a*-409*n* does not contain any or a sufficient amount of information. With some audio media, for example, particular sub-bands of frequency may not contain sufficient information to affect the overall sound of the audio, or may be masked by neighboring sub-bands that contain a substantially greater amount or magnitude of information. In these scenarios, bit allocation component 416 can selectively disable the conversion module associated with the frequency sub-bands of little information. For example, if frequency domain information 409*a* of the first sub-band has little or no information, bit allocation component 416 can disable conversion module 404*a* via control information 418. Therefore, only a subset of conversion modules 404*a*-404*n* may be used to transform frequency domain data streams 409*a*-409*n*, thereby decreasing the total amount of computations used for the conversion operation. Because the conversion operation can constitute a large proportion of the energy used by an audio format converter, the ability of audio format converter 400 to selectively enable or disable each of conversion modules 404*a*-404*n* may significantly decrease the energy used by format converter 400, and therefore increase the battery life of the electronic device.

Figure 5:
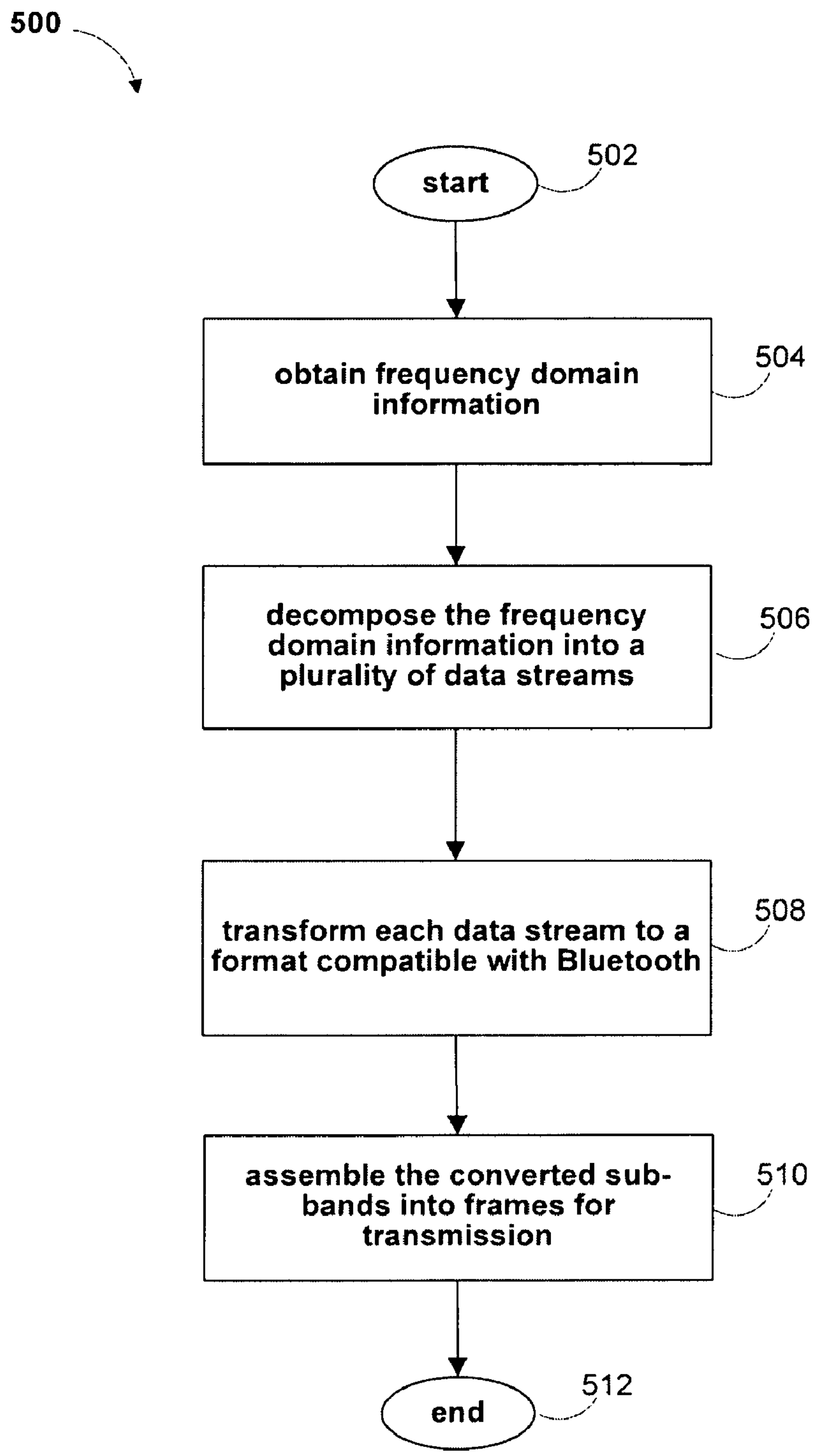
FIG. 5 shows a flow diagram of a simplified process for converting data into a format suitable for Bluetooth transmission in accordance with an embodiment of the invention.

FIG. 5 shows a simplified flow diagram of process 500 for converting the format of encoded data into a Bluetooth-compatible format in accordance with an embodiment of the invention. The illustrative steps of process 500 can be performed by a format converter, such as audio format converter 400 of FIG. 4. Process 500 can begin at step 502. At step 504, the format converter can obtain frequency domain information. The frequency domain information can be a representation of audio, visual, or audio/visual media, and can be frequency-encoded using any suitable frequency transform-based compression algorithm (e.g., the AAC algorithm). The frequency domain information may be contained within a frequency band, such as within a band where the frequencies are decipherable by the human ear. The frequency domain information can be obtained from any of a variety of sources, such as a storage module (e.g., storage module 102 of FIG. 1).

At step 506 of FIG. 5, the format converter can decompose the frequency domain information into a plurality of data streams. The data streams can be associated with distinct frequency sub-bands of the frequency band, where each data stream can represent the frequency domain information contained in one sub-band. At step 508, the format converter can transform each data stream to a format compatible with Bluetooth. For AAC-encoded music files, for example, the format converter can convert the MDCT-based data into a format that uses a different frequency transform-based compression algorithm (e.g., DCT-based algorithm). Then, at step 510, the format converter can assemble the transformed data streams into frames of appropriate sizes for Bluetooth transmission, and may perform any other functions necessary to prepare the transformed data streams for transmission over a Bluetooth link. Process 500 can then move to step 512 and end.

It should be understood that the steps of process 500 in FIG. 5 are merely illustrative. Any of the steps may be modified, removed, or combined, and additional steps may be added, without departing from the scope of the present invention. For example, a quantization step may be added to process 500, which can be used to quantize the transformed data streams prior to being prepared for Bluetooth transmission.

Figure 6:
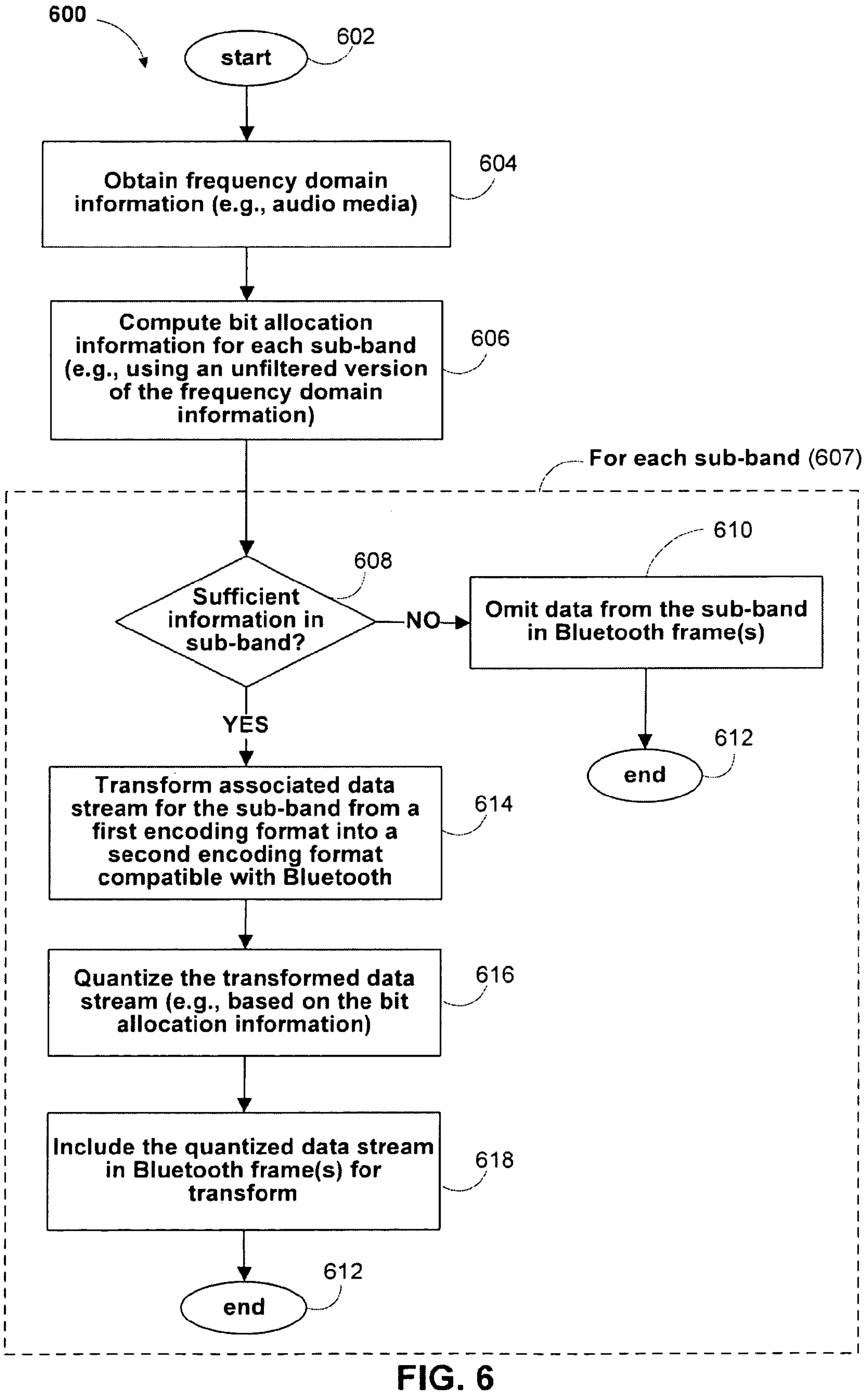
FIG. 6 shows a flow diagram of a simplified process for allocating bits when converting data for Bluetooth transmission in accordance with an embodiment of the present invention.

Referring now to FIG. 6, an illustrative flow diagram of process 600 is shown for allocating bits in a frequency sub-band using sub-band coding in accordance with an embodiment of the invention. Process 600 also illustrates one technique that a format converter (e.g., format converter 400 of FIG. 4) can use to convert encoded data from a first encoding format to second encoding format using an energy-efficient technique. Process 600 can start at step 602. At step 604, the format converter can obtain frequency domain information representative of media. For example, the frequency domain information can be a representation of audio, visual, or audio/visual media that lies within a frequency band, and can be frequency-encoded using any suitable frequency transform-based compression algorithm (e.g., the AAC algorithm).

In some embodiments, the compression algorithm used to create to the frequency domain information obtained at step 602 may be a high-quality compression algorithm. That is, the compression algorithm may be resource-intensive and not practical to perform in real-time, but may allocate bits to different frequency sub-bands in a manner that minimizes the adverse effects of compression. For example, the compression algorithm may be capable of effectively allocating bits in the frequency domain information for different sub-bands of the overall frequency band based on the frequency profile of the audio, video, or audio/visual media.

Process 600 may continue to step 606. At step 606, the format converter can compute bit allocation information for each sub-band. The format converter can compute the bit allocation information using, for example, a bit allocation component (e.g., bit allocation component 416). The bit allocation information for each sub-band may be indicative of an amount of the frequency domain information contained in that sub-band. The format converter can examine the amount of the original frequency domain information is contained in each frequency sub-band, and can determine which sub-bands warrant the most bits.

In some embodiments, the format converter can compute the bit allocation information at step 606 using an unfiltered version of the frequency domain information. That is, the format converter may operate using all or part of the frequency domain information while the frequency domain information is still in its original encoding format, and not partially or fully converted into the second encoding format. Because the original frequency domain information was produced from a high-quality compression algorithm, piggybacking off the computations of the high-quality compression algorithm may allow the bit allocation information to be both effective and computed in real-time.

Process 600 may continue to the steps of sub-process 607. The format converter can perform the steps of sub-process 607 for each of the sub-bands. At step 608, the format converter can determine whether there is sufficient amount of the frequency domain information contained in the current sub-band. The format converter can make this determination based on the bit allocation information previously computed at step 606 for the current sub-band. For example, the bit allocation information can indicate whether there is zero information in that sub-band, or whether there is below a predetermined amount of the frequency domain information in that sub-band (e.g., whether the magnitude of the frequency coefficients would not be perceived by a human ear and/or eye). If, at step 606, the format converter determines that there is insufficient information in the sub-band, process 600 can move to step 610.

At step 610, the format converter (or another component, such as Bluetooth circuitry) can omit data from the current sub-band in Bluetooth transmission frames. The Bluetooth frames can instead include information from one or more of the other sub-bands. In this situation, the format converter may not need to operate on (e.g., perform format conversion on) the data in the sub-band, and may rely on the information in the other sub-bands to produce an appropriate representation of the overall data. Following step 610, process 600 may move to step 612 and end (or return to step 608 so that the format converter can perform sub-process 607 for another sub-band).

Returning to step 608, if the format converter determines that there is sufficient information present in the sub-band (e.g., the audio, video, or audio/visual would be substantially perceived by a human ear and/or eye), process 600 can move to step 614. At step 614, the format converter can transform an associated data stream for the sub-band from a first encoding format into a second encoding format compatible with Bluetooth-transmission. The data stream may be a portion of the frequency domain information that is contained within the current sub-band.

Then, at step 616, the format converter can quantize the transformed data stream in the sub-band. The format converter can perform this quantization operation based on the bit allocation information previously computed at step 606. For example, the format converter can use a large number of quantization levels to achieve a finer resolution if the bit allocation information indicates that a relatively large proportion of the original frequency domain information (obtained at step 602) is contained within that sub-band. The format converter can use a small number of quantization levels to achieve a coarser resolution if the bit allocation information indicates that a relatively small proportion of the original frequency domain information is contained within the sub-band. As described above, because the bit allocation information may be computed based on an unfiltered version of the original frequency domain information, the number of quantization levels used to quantize the converted frequency domain information at step 616 may be an appropriate and effective number (e.g., minimizes the potential distortion in the resulting media).

Process 600 may continue to step 618. At step 618, the format converter (or another component, such as Bluetooth circuitry) may include the quantized data stream in one or more frames for Bluetooth transmission. The frames can include the quantized data stream produced at step 616, as well as quantized data streams for one or more other frequency sub-bands. Process 600 can then move to step 612 and end (or return to step 608 so that the format converter can perform sub-process 607 for another sub-band).

It should be understood that the steps of process 600 in FIG. 6 are merely illustrative. Any of the steps may be modified, removed, or combined, and additional steps may be added, without departing from the scope of the present invention.

The foregoing describes systems and methods for converting the format of compressed data to a format compatible with Bluetooth transmission. Those skilled in the art will appreciate that the invention can be practiced by other than the described embodiments, which are presented for the purpose of illustration rather than of limitation, and the invention is limited only by the claims which follow.

What is claimed is:

1. A format converter for performing format conversion on frequency domain information having a first encoding format, wherein the frequency domain information is contained within a frequency band, the format converter comprising:

a band separation module configured to decompose an unfiltered version of the frequency domain information into a plurality of data streams, wherein each of the data streams is associated with a distinct sub-band of the frequency band;

a bit allocation unit configured to compute bit allocation information for each of the sub-bands using the unfiltered version of the frequency domain information;

a plurality of conversion modules each configured to transform one of the data streams from the first encoding format to a second encoding format; and a plurality of quantizers, wherein each of the quantizers is configured to quantize one of the transformed data streams based on the bit allocation information for an associated sub-band.

2. The format converter of claim 1, wherein the bit allocation information for each sub-band is indicative of an amount of the frequency domain information contained in that sub-band.

3. The format converter of claim 2, wherein at least one of the plurality of conversion modules is selectively disabled when the bit allocation unit determines that at least one of the sub-bands does not contain at least a predetermined amount of the frequency domain information.

4. The format converter of claim 1, wherein the band separation module is implemented as a demultiplexer.

5. The format converter of claim 1, wherein the frequency domain information is compressed audio media.

6. The format converter of claim 1, wherein the first encoding format is an advanced audio coding (AAC) format.

7. The format converter of claim 1, wherein the second encoding format is compatible with a Bluetooth transmission protocol.

8. The format converter of claim 1, wherein each of the transformed data streams is represented in the frequency domain.

9. The format converter of claim 8, wherein the plurality of conversion modules are each configured to:

transform one of the data streams from a first frequency domain representation of a time domain signal to a second frequency domain representation of the time domain signal.

10. The format converter of claim 1, wherein the plurality of quantizers are each configured to:

quantize one of the transformed data streams into quantization levels, wherein the quantization levels are based on the bit allocation information for an associated sub-band.

11. The format converter of claim 1, wherein the plurality of conversion modules are each configured to transform one of the data streams from the first encoding format to the second encoding format without converting that data stream into a time domain representation.

12. A portable electronic device, comprising:

audio processing circuitry having a format converter for performing format conversion on frequency domain audio information, wherein the frequency domain audio information is contained within a frequency band, and wherein the format converter comprises:

a band separation module configured to decompose an unfiltered version the frequency domain audio information into a plurality of data streams, wherein each of the data streams is associated with a distinct sub-band of the frequency band;

a bit allocation unit configured to compute bit allocation information for each of the sub-bands using the unfiltered version of the frequency domain information;

a plurality of conversion modules each configured to transform one of the data streams from a first encoding format to a second encoding format; and a plurality of quantizers, wherein each of the quantizers is configured to quantize one of the transformed data streams based on the bit allocation information for an associated sub-band.

13. The portable electronic device of claim 12, further comprising a storage module for storing the frequency domain audio information.

14. The portable electronic device of claim 12, further comprising:

Bluetooth communications circuitry configured to transmit the quantized transformed data streams using a Bluetooth connection.

15. A method of performing format conversion on frequency domain information having a first encoding format, wherein the frequency domain information is contained within a frequency band, the method comprising:

decomposing an unfiltered version of the frequency domain information into a plurality of data streams, wherein each data stream is associated with a distinct sub-band of the frequency band;

computing bit allocation information for each of the sub-bands using the unfiltered version of the frequency domain information;

transforming at least one of the plurality of data streams from the first encoding format to a second encoding format; and quantizing each one of the transformed data streams based on the bit allocation information for an associated sub-band.

16. The method of claim 15, the method further comprising:

assembling the quantized transformed data streams into frames for transmission over a communications link.

17. The method of claim 15, wherein computing the bit allocation information comprises:

computing bit allocation information for one of the sub-bands that is indicative of an amount of the frequency domain information that is associated with that sub-band.

18. The method of claim 17, the method further comprising:

for each of the data streams:

determining whether the data stream contains at least a predetermined amount of information based on the bit allocation information for an associated sub-band; and in response to determining that the data stream contains at least the predetermined amount of information, transforming the data stream from the first encoding format to the second encoding format.

19. The method of claim 15, wherein the frequency domain information comprises:

compressed audio media.

20. The method of claim 19, wherein the frequency domain information comprises:

compressed audio media that is in an advanced audio coding (AAC) format.

21. The method of claim 15, wherein transforming the at least one of the data streams comprises:

converting the at least one of the data streams into a Bluetooth-compatible format.

22. The method of claim 15, wherein transforming the at least one of the data streams comprises:

converting the at least one of the data streams into data in the frequency domain.

23. The method of claim 22, wherein transforming the at least one of the data streams further comprises:

converting the at least one of the data streams from a first frequency domain representation of a time domain signal to a second frequency domain representation of the time domain signal.

24. The method of claim 15, wherein transforming the at least one of the data streams comprises:

transforming the at least one of the data streams from the first to the second format without converting the data stream into a time domain representation.

* * * * *